UNITED STATES PATENT OFFICE.

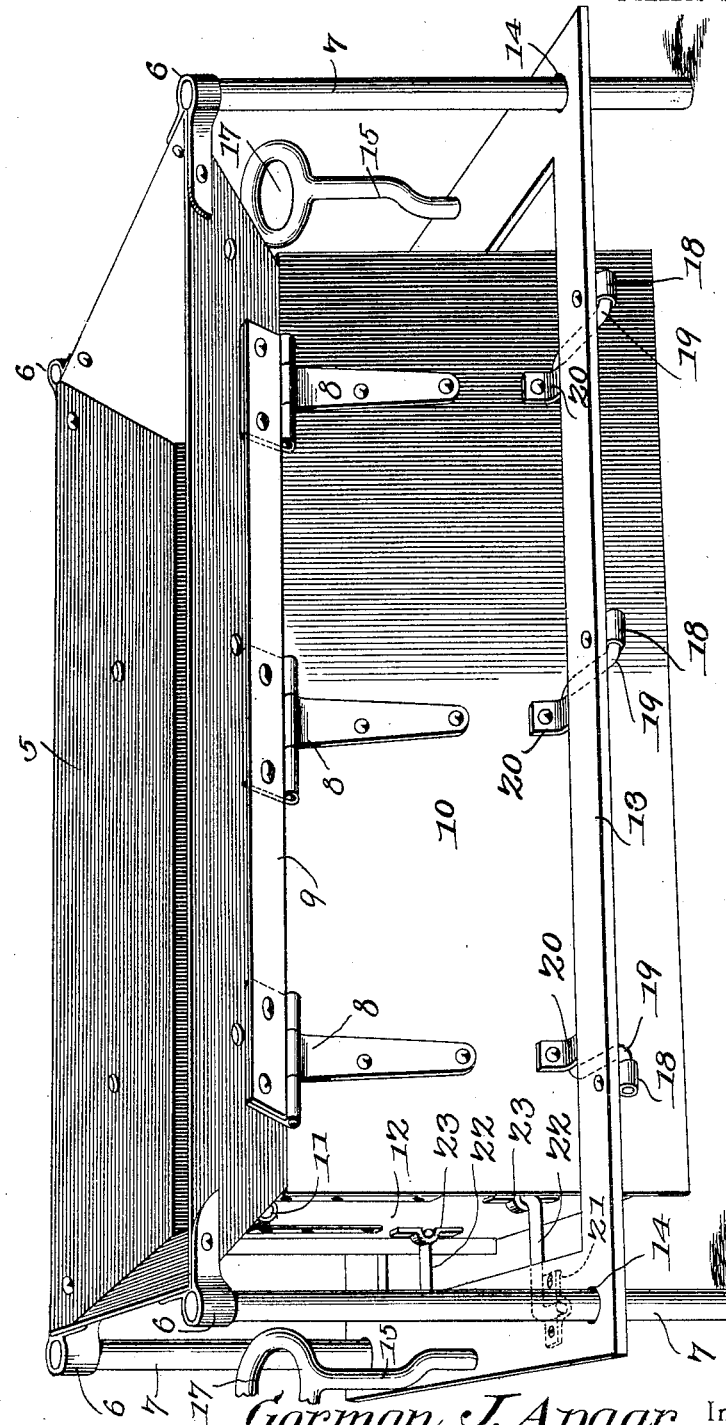

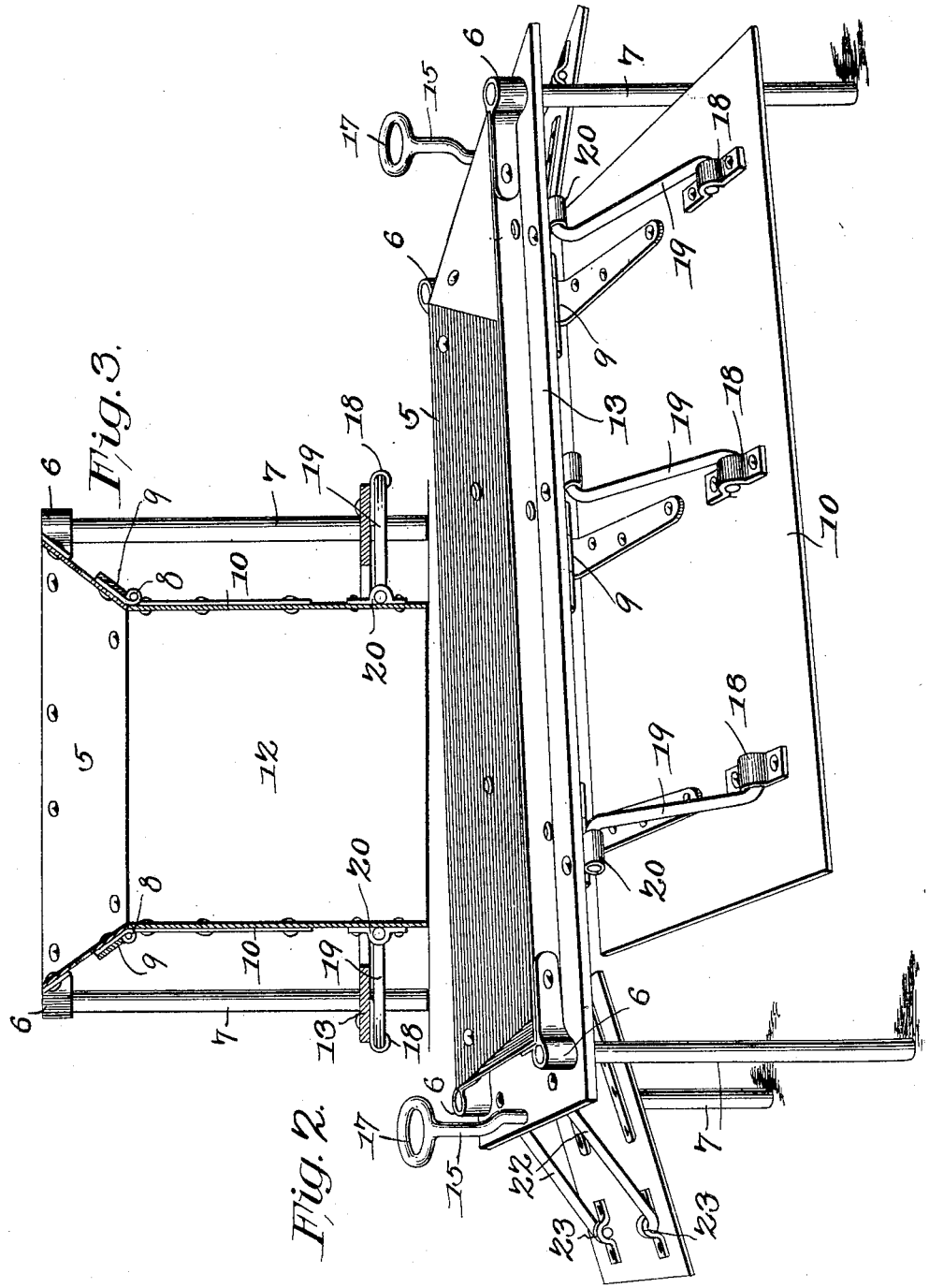

GORMAN J. APGAR, OF ROBINSON, ILLINOIS.

CEMENT-BLOCK MACHINE.

No. 810,019.      Specification of Letters Patent.      Patented Jan. 16, 1906.

Application filed February 13, 1905. Serial No. 245,487.

*To all whom it may concern:*

Be it known that I, GORMAN J. APGAR, a citizen of the United States, residing at Robinson, in the county of Crawford and State of Illinois, have invented a new and useful Cement-Block Machine, of which the following is a specification.

This invention relates to an improved mold for making artificial-stone building-blocks, and has for its object to provide an inexpensive, durable, and efficient mold of this character by means of which either hollow or solid building-blocks of different sizes and shapes may be conveniently and expeditiously manufactured.

A further object of the invention is to provide a mold having pivoted side and end walls movable to open and closed positions through the medium of a vertically-slidable operating-frame.

A still further object is to provide a pivoted connection between the operating-frame and the walls of the mold whereby when said frame is depressed the pivoted walls will be swung inwardly and assembled to permit the formation of the block, and when the frame is elevated said walls will be swung outwardly to thereby permit the discharge of the molded product.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

In the accompanying drawings, forming a part of this specification, Figure 1 is a perspective view of a mold constructed in accordance with my invention. Fig. 2 is a similar view showing the walls of the mold in position to release the block. Fig. 3 is a transverse sectional view.

Similar numerals of reference indicate corresponding parts in all the figures of the drawings.

The improved mold comprises a rectangular hopper 5, to the corners of which are riveted or otherwise rigidly secured loops or brackets 6, adapted to receive supporting-legs or uprights 7, the latter being preferably tubular in form and rigidly secured in said loops or brackets, so as to support the hopper in elevated position. Fastened to the sides of the hopper are hinges 8, to which are secured the movable side walls 10 of the mold, while pivoted to the opposite ends of the hopper, as shown at 11, are the movable end wall 12 of said mold. A longitudinal reinforcing-strip 9 is also preferably secured to the hinges and to the side wall of the hopper to thereby form a brace or support for the latter.

Spaced from the side and end walls of the mold is an operating-frame 13, provided with openings 14 for the reception of the uprights 7 and upon which said frame is mounted for vertical movement. Secured to the opposite ends of the frame 13 are vertical rods 15, the free ends of which are spaced from the end walls of the hopper and terminate in suitable handles 17, by means of which said frame may be conveniently operated to open and close the walls of the mold, as will be more fully explained hereinafter.

Riveted or otherwise rigidly secured to the bottom of the operating-frame, at the sides thereof, are loops or eyes 18, each adapted to receive one end of an angularly-disposed link 19, the opposite end of which engages a similar eye or loop 20, secured to the side wall 10 of the mold. Secured to the opposite ends of the frame are similar eyes or loops 21, supporting corresponding angular links 22, which are in turn pivoted in eyes or loops 23, fastened to the end walls 12 of the mold. The links 19 and 22 form pivotal connections between the operating-frame and the walls of the mold, so that when said frame is elevated by exerting an upward pull on the handles 17 the side and end walls of the mold will be swung outwardly to open position, as clearly shown in Fig. 2 of the drawings, and when said frame is depressed the walls will be swung inwardly in contact with each other, to thereby permit the formation of the block. The arrangement and disposition of the links 19 and 22 are such that when the pivoted walls of the mold are assembled or in closed position the links will assume positions substantially parallel with the bottom of the operating-frame and when the latter is elevated will exert an outward pull on the walls of the mold by reason of the pivotal connections between said links and the supporting eyes or loops.

In manufacturing the blocks the mold is placed upon a platform, table, or other suitable support, upon which has been previously placed a suitable pallet and the cement, concrete, or other plastic material shoveled or otherwise introduced into the mold and thoroughly tamped in any well-known manner. After the block is formed an upward pull exerted on the handles 17 will release the walls of the mold and elevate the latter from the platform or table, thereby permitting the molded product to be conveniently carried on the pallet to the drying-racks or other suitable place until ready for use. Hollow building-blocks may be readily formed by placing the usual cores in the mold preparatory to introducing the cement, and said blocks, whether hollow or solid, may be molded with an exterior finish in imitation of cut or chipped rock or other ornamental designs by inserting in the mold a pattern or die plate having the desired design stamped, embossed, or otherwise imprinted on the face thereof.

From the foregoing description it will be seen that there is produced an extremely simple and inexpensive mold admirably adapted for the attainment of the ends in view.

Having thus described the invention, what is claimed is—

1. A mold comprising a hopper, side and end walls pivoted thereto, and a vertically-slidable operating member for moving said walls to open and closed positions.

2. A mold comprising a hopper, side and end walls pivoted thereto, a vertically-slidable member for moving said walls to open and closed positions, and means for operating said member.

3. A mold having movable walls, an operating member surrounding said walls and adapted to move the latter to open and closed positions, and a pivotal connection between said walls and the operating member.

4. A mold having pivoted walls, a vertically-slidable member surrounding said walls and adapted to move the latter to open and closed positions, a pivotal connection between said walls and the slidable member, and means for operating said member.

5. A mold having movable side and end walls, a vertically-slidable frame surrounding said walls and spaced from the latter for moving the same to open and closed positions, and a pivotal connection between said walls and frame.

6. A mold comprising a hopper, side and end walls pivoted to the hopper, uprights for supporting said hopper, a frame mounted for vertical movement on the uprights, and a pivotal connection between said walls and frame.

7. A mold comprising a hopper, side and end walls pivoted to the hopper, uprights for supporting said hopper, a frame mounted for vertical movement on the uprights, and links pivoted to the frame and walls, respectively.

8. A mold comprising a hopper, side and end walls pivoted to the hopper, uprights for supporting said hopper, a frame mounted for vertical movement on the uprights, and handles secured to the frame for reciprocating the latter to thereby open and close said walls.

9. A mold comprising a hopper, side and end walls pivoted to the hopper, uprights for supporting said hopper, a frame mounted for vertical movement on the uprights, a pivotal connection between said walls and frame, and means for limiting the vertical movement of the latter.

10. A mold comprising a hopper provided with supporting-brackets, side and end walls pivoted to the hopper, uprights seated in said brackets, a frame surrounding the pivoted walls and provided with openings for the reception of the uprights, links pivoted to the walls and frame, respectively, and rods carried by the frame and having their free ends provided with terminal handles.

11. A portable mold comprising a hopper having side and end walls pivoted thereto, and a combined carrying and operating member serving during its initial movement to move said walls to open and closed positions.

12. A portable mold comprising a hopper having side and end walls pivoted thereto, a vertically-slidable operating member for moving said walls to open and closed positions, and handles carried by the operating member for elevating and carrying said mold.

In testimony that I claim the foregoing as my own I have hereto affixed my signature in the presence of two witnesses.

GORMAN J. APGAR.

Witnesses:
 JOHN S. ABBOTT,
 W. G. EATON.